(12) United States Patent
Schwartz

(10) Patent No.: US 8,735,744 B2
(45) Date of Patent: May 27, 2014

(54) THREE-CABLE PORT GROMMET WASHER

(75) Inventor: Howard Clark Schwartz, Dallas, TX (US)

(73) Assignee: Corning Cable Systems LLC, Hickory, NC (US)

(*) Notice: Subject to any disclaimer, the term of this patent is extended or adjusted under 35 U.S.C. 154(b) by 106 days.

(21) Appl. No.: 13/479,901

(22) Filed: May 24, 2012

(65) Prior Publication Data

US 2012/0298415 A1 Nov. 29, 2012

Related U.S. Application Data

(60) Provisional application No. 61/489,452, filed on May 24, 2011, provisional application No. 61/489,461, filed on May 24, 2011.

(51) Int. Cl.
*H02G 3/18* (2006.01)

(52) U.S. Cl.
USPC .......................................... 174/652; 439/578

(58) Field of Classification Search
USPC ...................... 174/652; 439/578, 441; 385/89; 310/68 R
See application file for complete search history.

(56) References Cited

U.S. PATENT DOCUMENTS

| | | | | |
|---|---|---|---|---|
| 3,833,754 A | * | 9/1974 | Philibert | 174/653 |
| 4,053,196 A | * | 10/1977 | Dunaway | 310/68 R |
| 5,504,276 A | | 4/1996 | Kunze | 174/151 |
| 5,774,618 A | | 6/1998 | Jones | 385/135 |
| 6,875,926 B2 | | 4/2005 | Buekers et al. | 174/100 |
| 7,440,667 B2 | | 10/2008 | Mullaney et al. | 385/135 |
| 7,568,943 B2 | * | 8/2009 | Harrison et al. | 439/578 |
| 7,581,976 B2 | | 9/2009 | Liepold et al. | 439/282 |
| 7,780,173 B2 | | 8/2010 | Mullaney et al. | 277/621 |
| 7,799,995 B2 | | 9/2010 | Mullaney et al. | 174/77 R |
| 2007/0036488 A1 | | 2/2007 | Harrison et al. | 385/76 |
| 2008/0224419 A1 | | 9/2008 | Mullaney et al. | 277/602 |

FOREIGN PATENT DOCUMENTS

| | | | | |
|---|---|---|---|---|
| DE | 10356386 B3 | 5/2005 | | H02G 3/22 |
| WO | 2005088374 A1 | 9/2005 | | G02B 6/44 |

OTHER PUBLICATIONS

Preformed Line Products, Coyote Dome 9.5"x 28", Nov. 2010, pp. 1-12.

* cited by examiner

*Primary Examiner* — Dhirubhai R Patel

(57) ABSTRACT

A cable attachment assembly for sealing and retaining three flat cables entering a telecommunications closure provides a grommet having three radially arrayed passageways and a grommet washer having a flat portion and a raised portion for simultaneously maintaining compressive force to the grommet and mitigating creep of the grommet during thermal cycling.

14 Claims, 8 Drawing Sheets

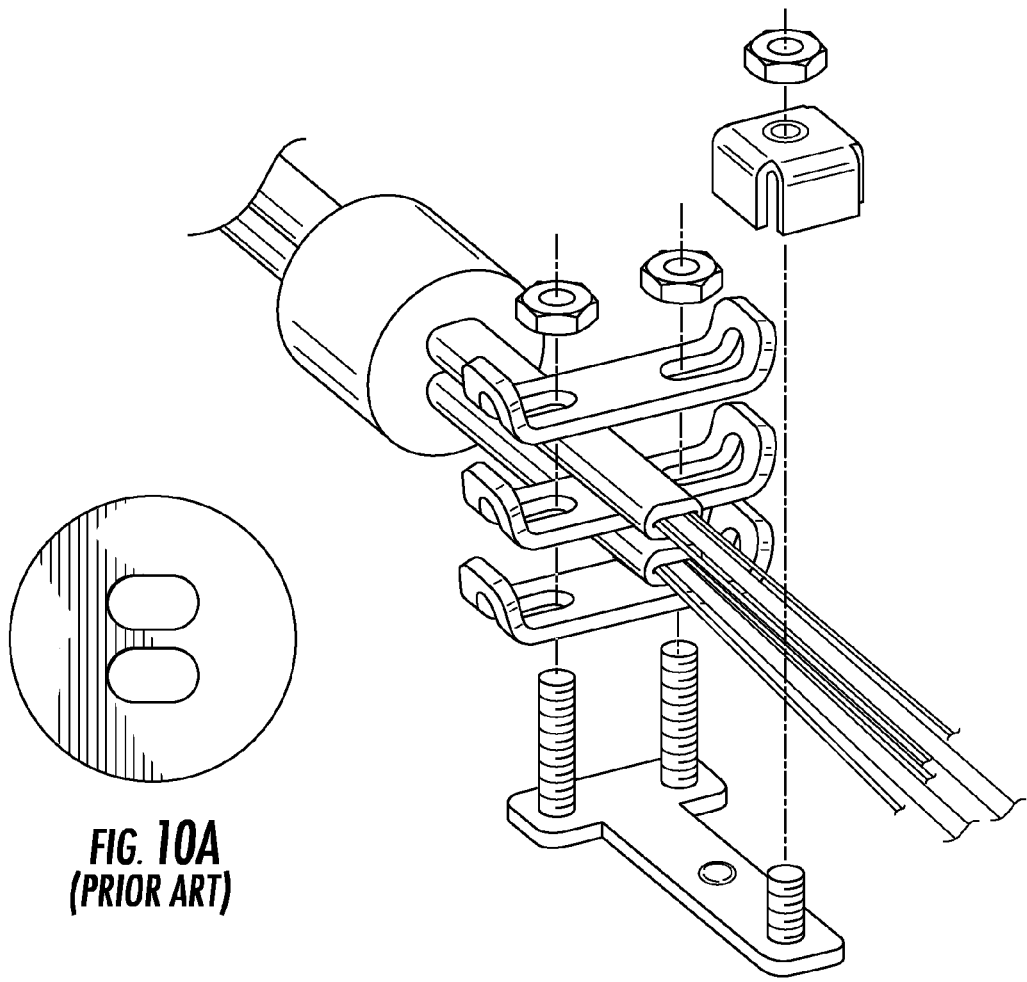
FIG. 10A
(PRIOR ART)
FIG. 10B
(PRIOR ART)
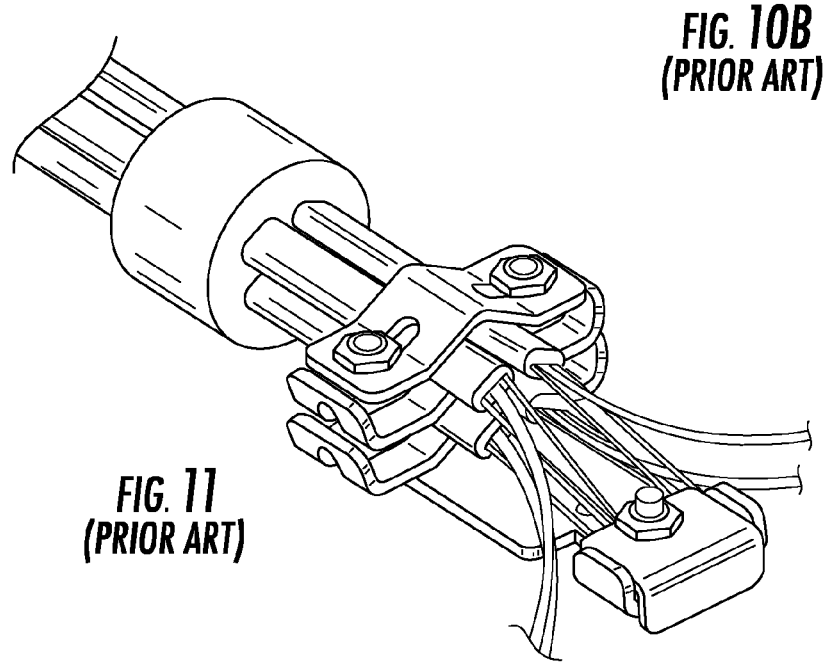
FIG. 11
(PRIOR ART)

THREE-CABLE PORT GROMMET WASHER

CROSS-REFERENCE TO RELATED APPLICATIONS

This application claims the benefit of priority under 35 U.S.C. §119 of U.S. Provisional Application Ser. No. 61/489,452 and U.S. Provisional Application No. 61/489,461, both filed on filed May 24, 2011 the content of which is relied upon and incorporated herein by reference in its entirety.

BACKGROUND

1. Technical Field

The disclosure relates to sealing elements, and more particularly sealing elements that secure a radial array of flat optical cables.

2. Field of the Disclosure

Currently there are a number of multiport closures that use elastomeric grommets around cables to water-proof against leakage up to a pressure created by what is known in the industry as an equivalent 10 foot water "head" (roughly about 5 psi). Such a grommet seal is required to be reliable for many years which explains why such designs are environmentally aged before pressure testing.

Due to the nature of customer demand what is needed is a three cable port, seal and strain relief for allowing fiber optic cables to enter a cable port three(3) at a time.

No admission is made that any reference cited herein constitutes prior art. Applicant expressly reserves the right to challenge the accuracy and pertinency of any cited documents.

SUMMARY

A cable attachment assembly for sealing and retaining a cable entering a telecommunications closure through an opening defined in the closure is disclosed, including an adapter body, associated with the opening of a closure, the adapter body providing at least one opening for allowing passage of at least one cable. At least one grommet device is also included, the grommet device being associated with the at least one opening of the adapter body, defining at least one passageway for allowing the at least one cable to traverse the grommet device in a generally axial direction relative to the cable. A bolt portion compressively engages the grommet washer and is capable of selectively applying a compressive force upon the grommet device such that the grommet device engages the outer surface of the cable; and a grommet washer associated with the grommet device and the bolt portion, the grommet washer having at least one opening to allow the cable to pass through.

In one aspect of the disclosure, the grommet washer includes a flat region and a raised region. The grommet washer may further be sandwiched between the bolt portion and the grommet device, the flat region engaging an outer portion of the end of the grommet device on one side and a peripheral surface of the bolt portion on the other side.

In another aspect of the disclosure, the flat region may have at least one pre-engagement alignment feature for preventing rotation of the grommet washer relative to the grommet device while the bolt portion applies the compressive force.

The raised region of the grommet washer may be oriented away from the grommet device, the raised region having an interior portion for receiving a portion of the grommet device under compression and preventing creep.

The grommet washer including a support structure associated with each of the plurality of openings, the support structure including at least one cable engaging surface for engaging the at least one optical cable, the support structure being located substantially on the raised portion.

The support structure defining an offset, the offset capable of supporting the at least one optical cable in association to at least one other optical cable such that neither optical cable contacts the other optical cable.

The support structure defining an offset capable of supporting the at least one optical cable in association to at least two other optical cables such that none of the three optical cable contacts any other of the optical cables.

The grommet washer being made from a polymer selected from the group consisting of a thermoplastic and a thermoset. The grommet washer being made from a low friction thermoplastic. The grommet washer being made from a polyoxymethylene.

The grommet device being made from an elastomeric material selected from the group consisting of a rubber, a silicone, a polybutadiene, a fluoroelastomer, a thermoplastic elastomer, a chloroprene, a propylene and a urethane.

A cable attachment assembly for sealing and retaining a cable entering a telecommunications closure through an opening defined in the closure, the cable attachment assembly comprising: an adapter body, the adapter body associated with the opening of a closure, the adapter body providing at least one opening for allowing passage of at least one cable; a grommet device, the grommet device associated with the at least one opening of the adapter body, the grommet device defining at least one passageway for allowing the at least one cable to traverse the grommet device in a generally axial direction relative to the cable; a bolt portion, the bolt portion capable of selectively applying a compressive force upon the grommet device such that the grommet device engages the outer surface of the cable and an inner surface of the opening defined in the closure; and a grommet washer, the grommet washer having a plurality of openings, each opening adapted to allow at least one cable to pass through, the grommet washer including a flat region and a raised region, the grommet washer being sandwiched between the bolt portion and the grommet device, the flat region engaging an outer portion of the end of the grommet device on one side and a peripheral surface of the bolt portion on the other side.

The grommet washer including a support structure associated with each of the plurality of openings. The support structure including at least one cable engaging surface for contacting the at least one optical cable. The grommet washer including a support structure associated with each of the plurality of openings, the support structure including at least one cable engaging surface for engaging the at least one optical cable, the support structure being located substantially on the raised portion.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10A is a top view of a prior art grommet for sealing two cables;

FIG. 10B is a partially exploded perspective view of the prior art grommet of FIG. 10A with two cables and a strain relief assembly;

FIG. 11 is a perspective view of another prior art assembly showing a four cable grommet and associated strain relief hardware;

DETAILED DESCRIPTION

Figure 1:
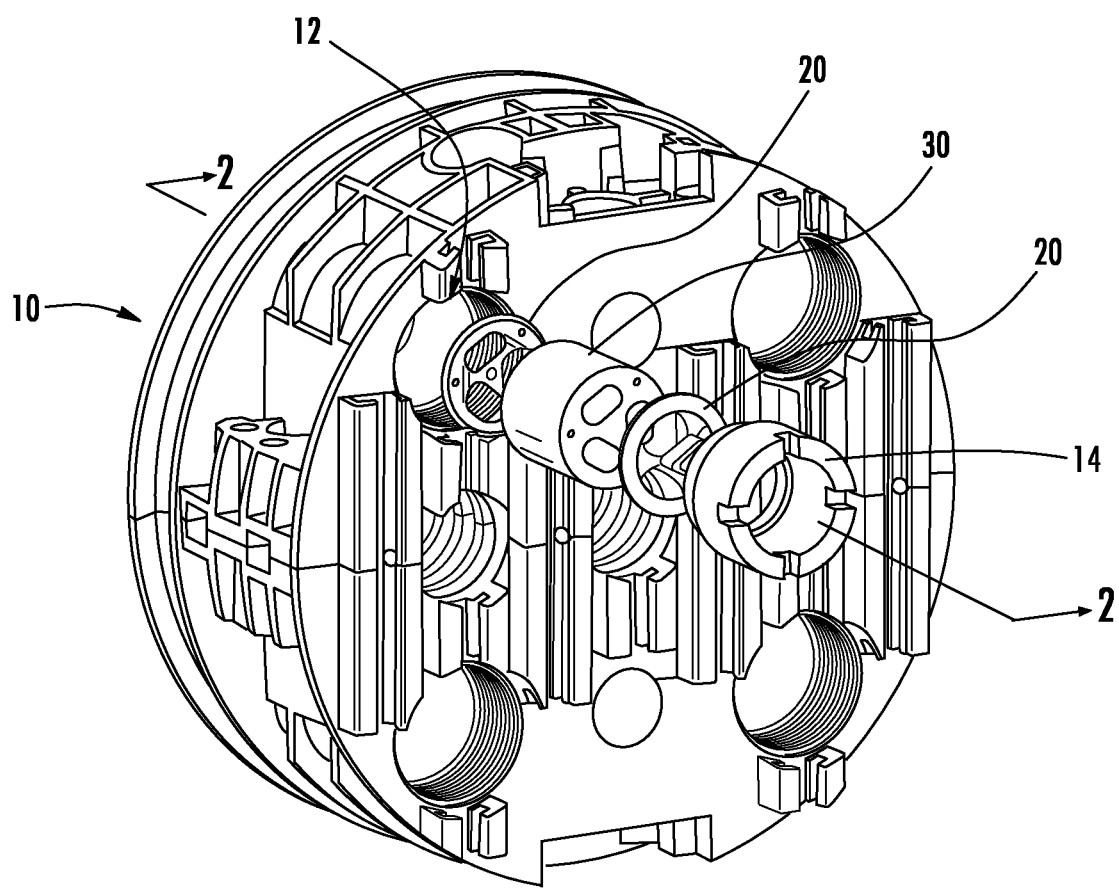
FIG. 1 is a partially exploded perspective view of a cable attachment assembly including an adapter body ready to receive a grommet device, at least one grommet washer and a bolt portion.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

The disclosure is generally a sealing insert and strain relief insert for sealing and securing up to three cables through a cable port of a closure, for example, the end cap or adapter of a closure. The sealing insert may include a grommet device having a generally elongated body with at least one aperture traversing the elongated body generally parallel to a longitudinal axis. The strain relief insert may include a generally elongated body with at least one slot for transversely inserting for example a cable for locking the cable with a cable receiving area. A securing device, for example, a clamp, may be place about the strain relief insert for applying a compressive force generally about the strain relief insert, forcing at least a portion of the strain relief insert onto the cable. This locks the cable relative to the strain relief insert from axial or rotational movement. The clamp may be secured to, for example, a bulkhead of a closure to further secure the cables relative to the closure.

FIG. 1 is a partially exploded perspective view of a cable attachment assembly including an adapter body 10, for example, a closure end cap, ready to axially receive at least one grommet washer 20, at least one grommet device 30 and a bolt portion 14. In exemplary embodiments adapter body 10 may include at least one cable port 12, and in other embodiments may include a plurality of cable ports 12. Cable attachment assembly may seal and retain at least one cable entering, for example, a telecommunications closure through an opening defined in the closure, for example, cable port 12.

Figure 3:
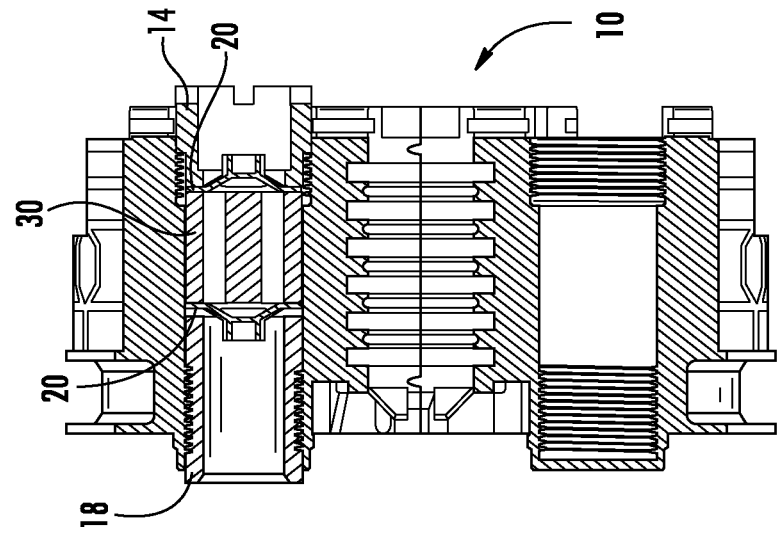
FIG. 3 is a cutaway side view of the cable attachment assembly of FIG. 1 having the grommet device, the at least one grommet washer and the bolt fully engaged to each other.
Figure 2:
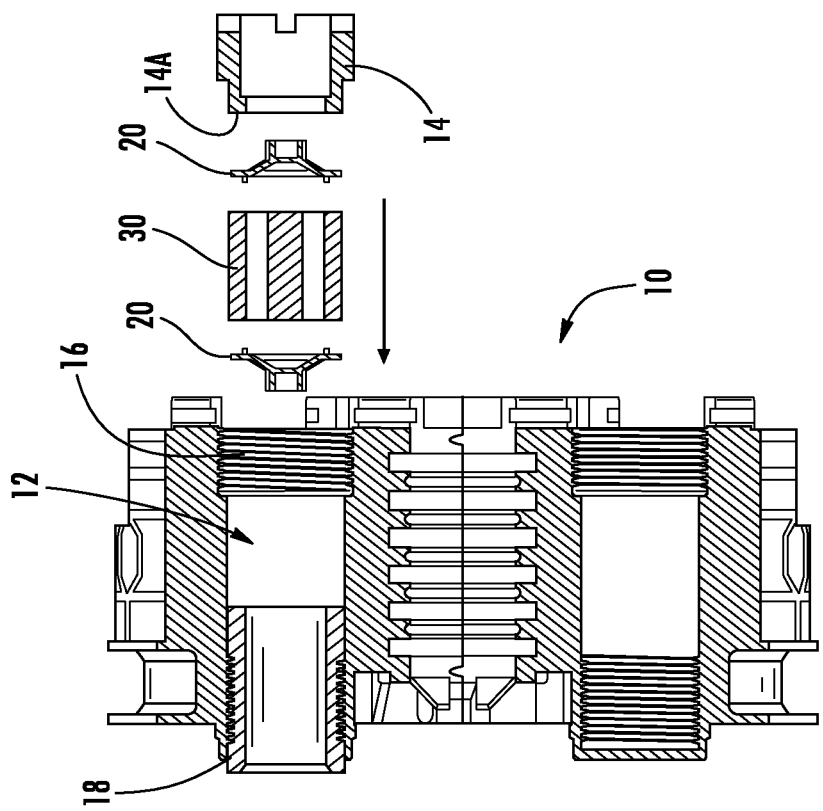
FIG. 2 is a cutaway side view of the cable attachment assembly of FIG. 1.

Exemplary embodiments of the cable attachment assembly, as shown in FIGS. 2 and 3, may include at least one forward bolt portion 18 threadably engaged with cable port 12, grommet device 30 sandwiched between two opposing grommet washers 20 and secured axially within cable port 12 by rearward bolt portion 14. Bolt portion 14, by way of example, may be threadably engaged to cable port 12 by port threading 16 for axially locking the assembly together. Bolt portion 14 may be capable of selectively applying a compressive force upon grommet device 30 such that grommet device 30 engages the outer surface of cable 50. In exemplary embodiments bolt portion 14 provides the compressive force for axially forcing grommet washers 20 toward one another causing deflection of grommet device 30. Grommet washer 20 may engage an end of grommet device 30 on one side and a peripheral surface 14a of the bolt portion on an opposite side.

Adapter body 10 may be associated with the opening of a closure, for example, a canister closure or dome closure in an exemplary embodiment, but other closures may be contemplated. Adapter body 10 may provide at least one opening, or cable port 12 for allowing passage of at least one cable, for example a fiber optic cable, from an exterior to an interior of the telecommunications closure.

At least one cable 50 (see FIGS. 12 and 13) may be sealed within cable port 12 by cooperation of at least one grommet device and at least one grommet washer 20. Grommet device 30 may be associated with the at least one opening of adapter body 10. Grommet device 30 may define at least one passageway 38 (see FIG. 6) for receiving and allowing at least one cable 50 to traverse the grommet device in a generally axial direction relative to cable 50. Put another way, cable 50 may be thrust through passageway 38, which is sized to closely contact the outside of cable 50.

Figure 4:
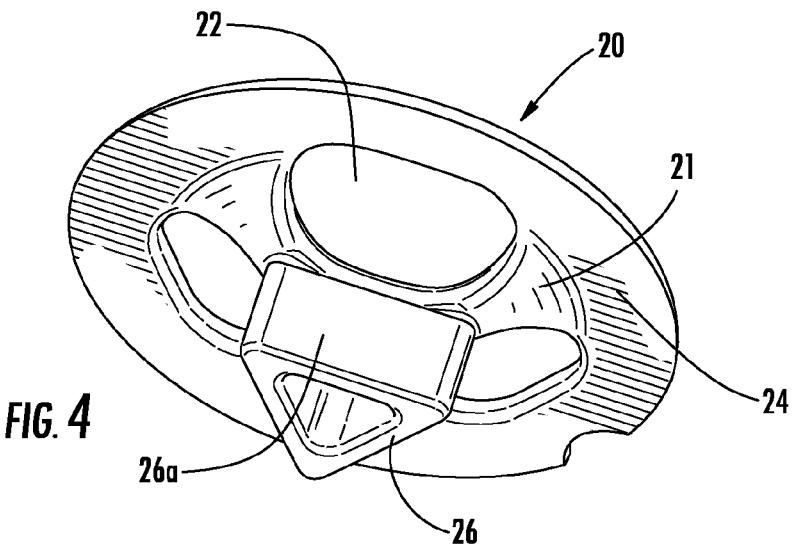
FIG. 4 is a perspective view of a grommet washer.
Figure 5A:
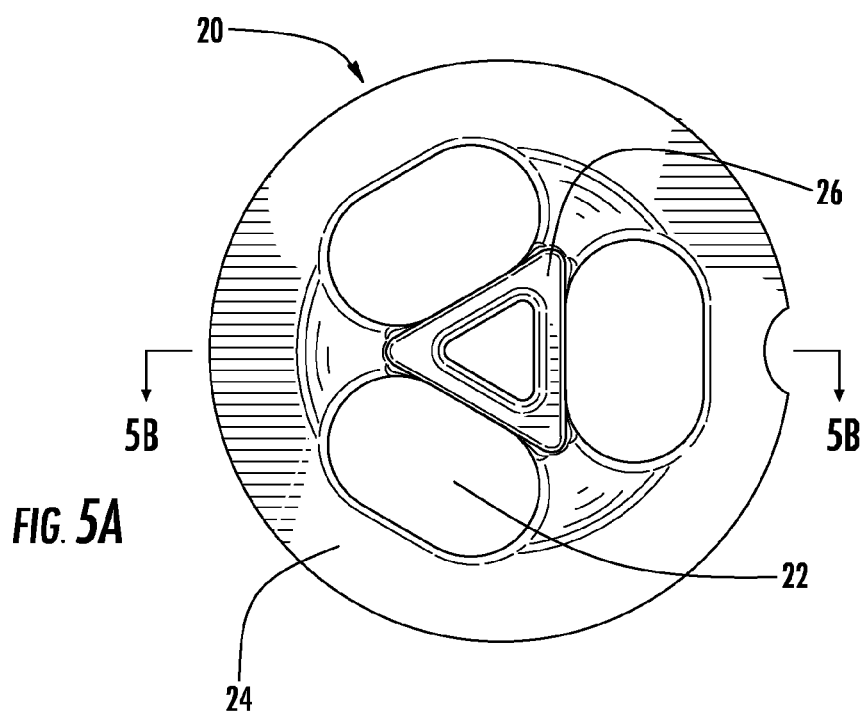
FIG. 5A is a top view of the grommet washer of FIG. 4.
Figure 5B:
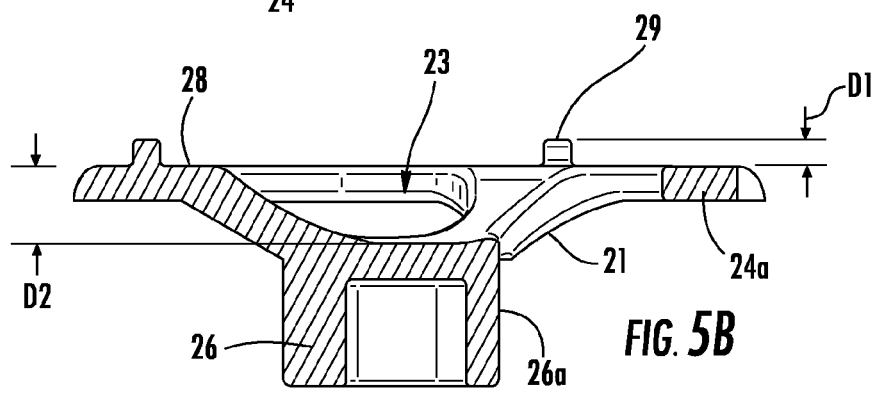
FIG. 5B is a cutaway side view of the grommet washer of FIG. 5A.

In exemplary embodiments, grommet washer 20 may be associated with grommet device 30 and bolt portion 14, grommet washer 20 having at least one opening to allow cable 50 to pass through. As shown in FIG. 4, 5A and 5B, grommet washer 20 may include at least one opening 22, and in exemplary embodiments may include at least three openings 22. A flat region comprising bolt engagement surface 24 and grommet engagement surface 28 may receive the majority of the compressive force from bolt portion 14. A raised region 21 disposed toward the center portion of grommet washer 20 may be associated with openings 22. A support structure 26 may be have at least one cable engagement surface 26a, for example, three cable engagement surfaces 26a, for limiting the proximity of the cables to one another while entering through cable port 12. Support structure 26 may define an offset, the offset capable of supporting the at least one optical cable in association to at least one other optical cable such that neither optical cable contacts the other optical cable. Furthermore, the offset may be capable of supporting the at least one optical cable in association to at least two other optical cables such that none of the three optical cable contacts any other of the optical cables. Support structure 26 may be a generally triangular protrusion extending from a center portion of raised region 21. Support structure 26 may also provide a handling feature for use during assembly by an operator.

Figure 6:
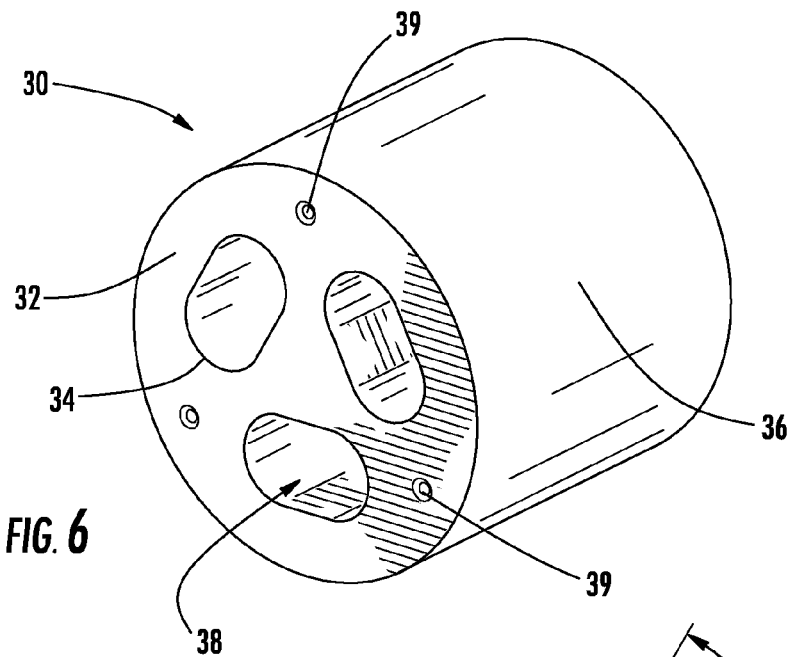
FIG. 6 is a perspective view of a grommet device.
Figure 7A:
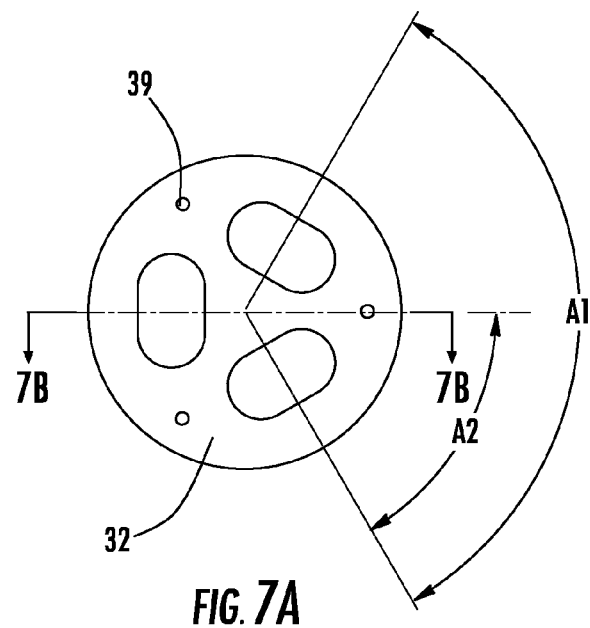
FIG. 7A is a top view of the grommet device of FIG. 6.
Figure 7B:
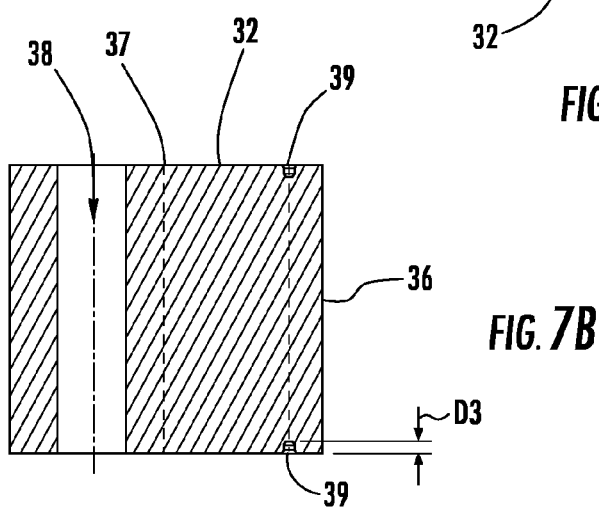
FIG. 7B is a cutaway side view of the grommet device of FIG. 7A.

Grommet washer 20 may also include at least one pre-engagement protrusion 29, for example, a plurality of pre-engagement protrusions 29 for co-axially aligning grommet washer 20 to grommet device 30 during installation. Pre-engagement protrusion 29 may extend from grommet engagement surface 28 and have a nominal height D1, for example, of about one millimeter (1 mm) As shown in FIGS. 6, 7A and 7B, grommet device 30 includes corresponding pre-engagement receptacles 39 extending into surface 32 for a distance D3 for receiving pre-engagement protrusions 29. Distance D3 may correspond to nominal height D1. Pre-engagement protrusions 29, in cooperation with pre-engagement receptacles 39, may also prevent rotational misalignment of grommet washer 20 relative to grommet device 30 during installation. Further rotational misalignment may be prevented by material selection, for example, by making grommet washer 20 out of a low friction material. In exemplary embodiments, grommet washer may be made from a polymer selected from the group consisting of a thermoplastic and a thermoset. In further exemplary embodiments, grommet washer 20 may be made from a low friction thermoplastic, for example, polyoxymethylene.

Raised region 21 may define a concave 23 (FIG. 5B). Concave 23, in exemplary embodiments, may prevent, for example, creep of grommet device 30 over extended periods of compression. Creep, by definition, is a tendency of a material to move slowly under the influence of stresses, and may manifest by way of protruding centrally away from the area of most compressive stress, for example, during thermal cycling of grommet device 30 over time. Concave 23 may cooperate with raised region 21 and may arrest the creeping material, unlike a conventional compression washer that typically does not include any creep arresting features. Concave 23 may have a depth D2, for example, that is about 5% to about 15% of the outer diameter of grommet washer 20. In exemplary embodiments, concave 23 may be from 10% to 11% of the outer diameter of grommet washer 20.

Returning to FIGS. 6, 7A and 7B, grommet device 30 may also include at least one cable sealing aperture 34 for receiving at least one cable. In exemplary embodiments, at least three cable sealing apertures 34 are located radially around a longitudinal axis 37 (FIG. 7B), divided by an angular displacement A1, for example, 120 degrees (FIG. 7A). In exemplary embodiments, pre-engagement receptacles 39 may also be radially arrayed around axis 37, and may be offset from apertures 34 by angular displacement A2, for example, 60 degrees.

Grommet device 30 may be made, for example, from an elastomeric material selected from the group consisting of a rubber, a silicone, a polybutadiene, a fluoroelastomer, a thermoplastic elastomer, a chloroprene, a propylene and a urethane. In exemplary embodiments, grommet device 30 may be made from a silicone.

Figure 8:
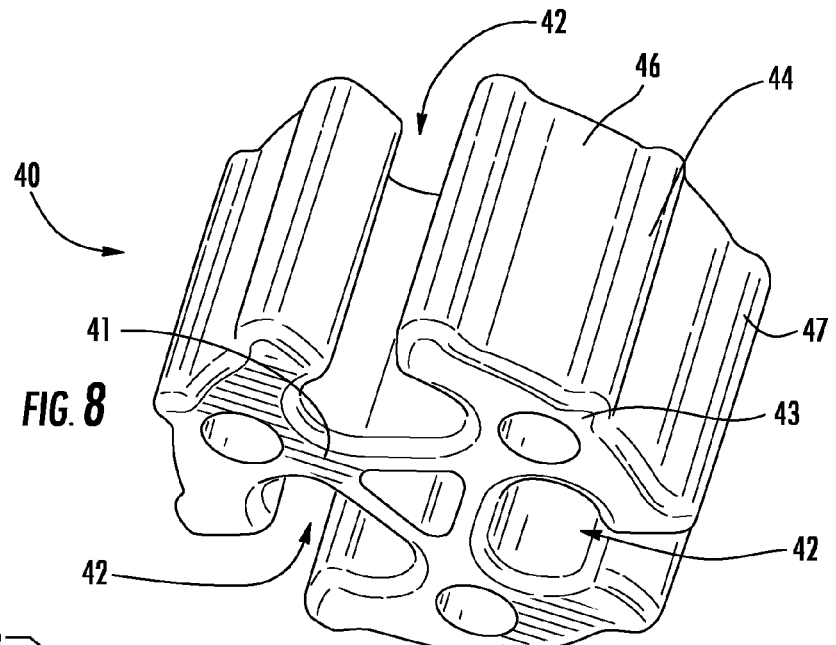
FIG. 8 is a perspective view of a strain relief insert.
Figure 9A:
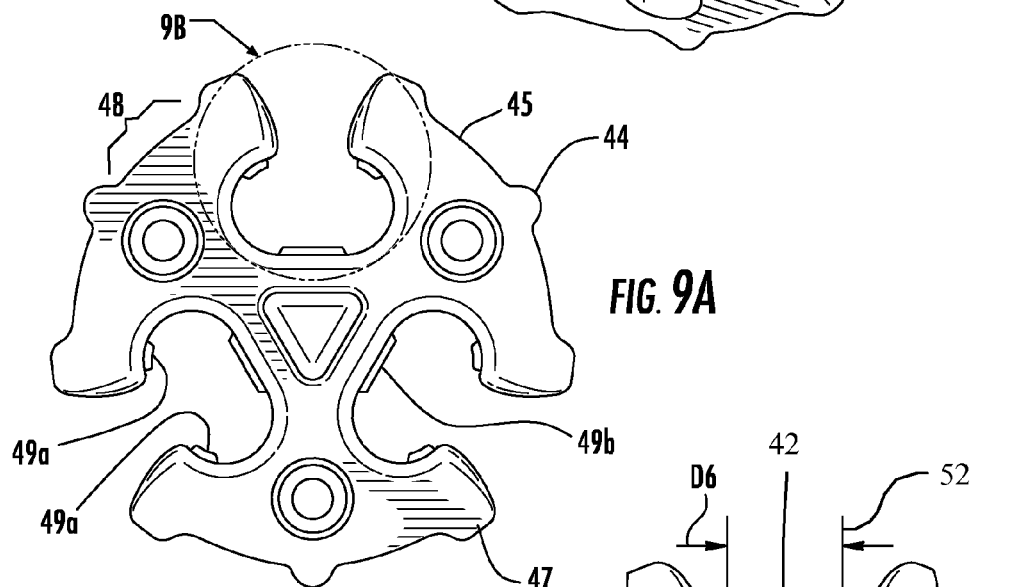
FIG. 9A is a top view of the strain relief insert of FIG. 8.
Figure 9B:
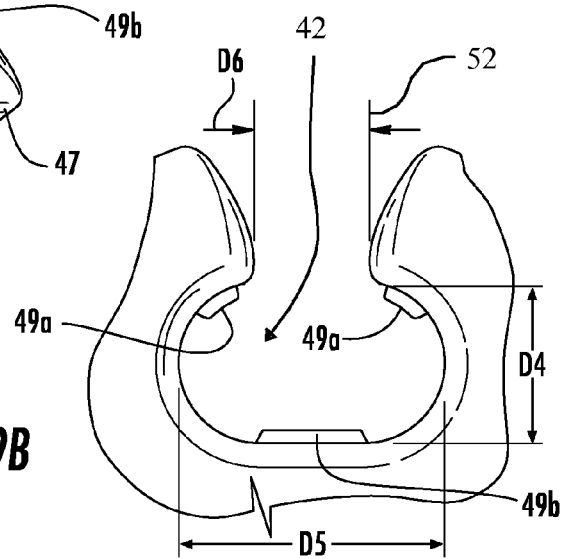
FIG. 9B is a detail view of a portion of the strain relief insert of FIG. 9A.

In exemplary embodiments, the cable attachment assembly may include at least one strain relief device 40, shown in FIGS. 8, 9A and 9B. Strain relief device 40 may include a body 41 having a two opposing ends, a length and a longitudinal axis in general alignment with an axis of the at least one optical cable 50. Body 41 may generally define at least one cable receiving region 42. Cable receiving region 42 may be further defined by at least one armature 43 and at least one cantilevered segment 46. Cable receiving region may have an internal profile similar to an intended cable to be received, for example, a flat cable may result in a generally ovoid, or oblong, profile for cable receiving region 42 and a round cable may result in a generally round profile for cable receiving region 42.

In exemplary embodiments, armature 43 may generally extend from a central region of body 41 and include at least one cantilevered segment 46. Cantilevered segment 46 may generally extend from armature 43 in a radial direction. Two opposing cantilevered segments may extend toward one another. Cable receiving region 42 may be further defined by two such cantilevered segments 46 extending toward one another. Cantilevered segment 46 may include at least one force concentration lobe 47 disposed on a distal end of segment 46. In exemplary embodiments, each armature 43 may have two cantilevered segments 46 extending generally radially around the periphery of strain relief device 40 and away from each other. At least one stand-off ridge 44 may extend from each armature 43 and separate each of the two cantilevered segments 46 on each armature 43. The region between each respective force concentration lobe 47 and stand-off ridge 44 may define a depression 45.

In exemplary embodiments, cable receiving region 42 may include at least one cable retention feature 49a, 49b for intruding into a jacket of the cable while under compression, for example, by a clamp, for locking the cable relative to the strain relief device 40. As shown in FIGS. 9A and 9B, retention features 49a may be disposed on the ends of cantilevered arms 46. A cable receiving gap 52 defined by distance D6 is disposed between retention features 49a, the gap 52 being in communication with cable receiving region 42 and is adapted to transversely receive cable 50 into cable receiving region 42. In exemplary embodiments, D6 may be less than a minimum thickness of a cable to be inserted therethrough, e.g., D6 may be less than four (4) mm, for example, for a flat drop cable. Relaxed distance D4 may be just large enough for receive a cable.

FIGS. 10A, 10B and 11 show typical prior art cable retention and sealing components. The complicated componentry of the prior art strain relief design is unwieldy and includes a large number of metal parts. The strain relief device 40 of the present disclosure is a simple, one part functional element that utilizes, for example, a common hose clamp to supply the compressive force needed to secure cables. In exemplary embodiments, strain relief device 40 is made from a firm yet flexible material, for example, a polymer. In exemplary embodiments, strain relief device may be a thermoplastic, for example, a thermoplastic polyester elastomer.

Figure 12:
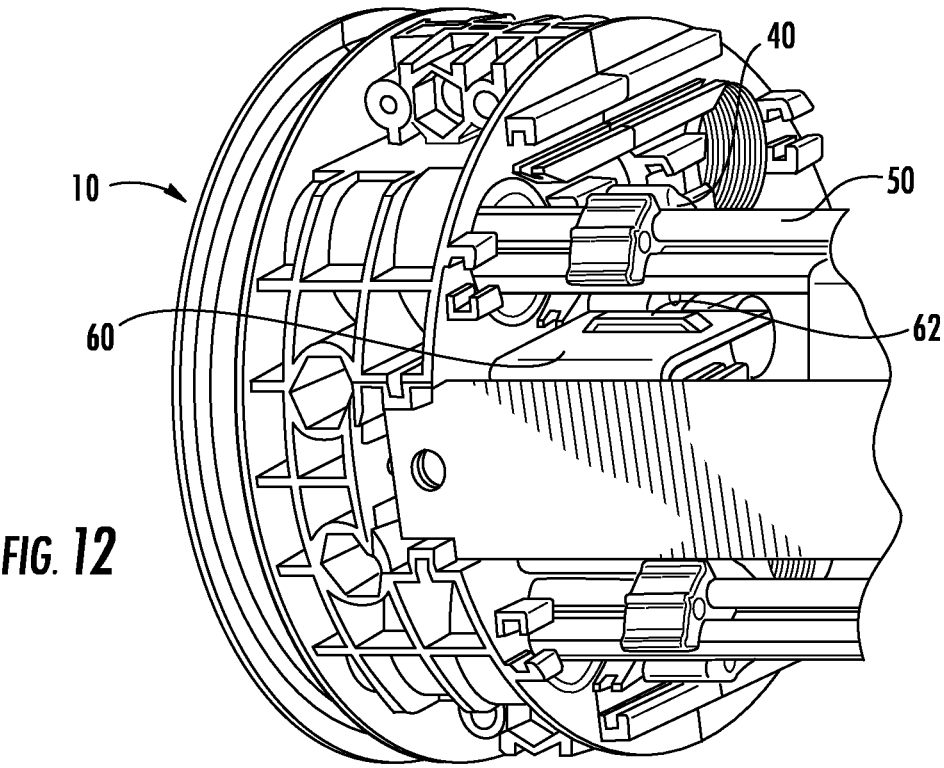
FIG. 12 is a perspective view of the strain relief insert placed about three cables in position to be secured to a bulkhead.
Figure 13:
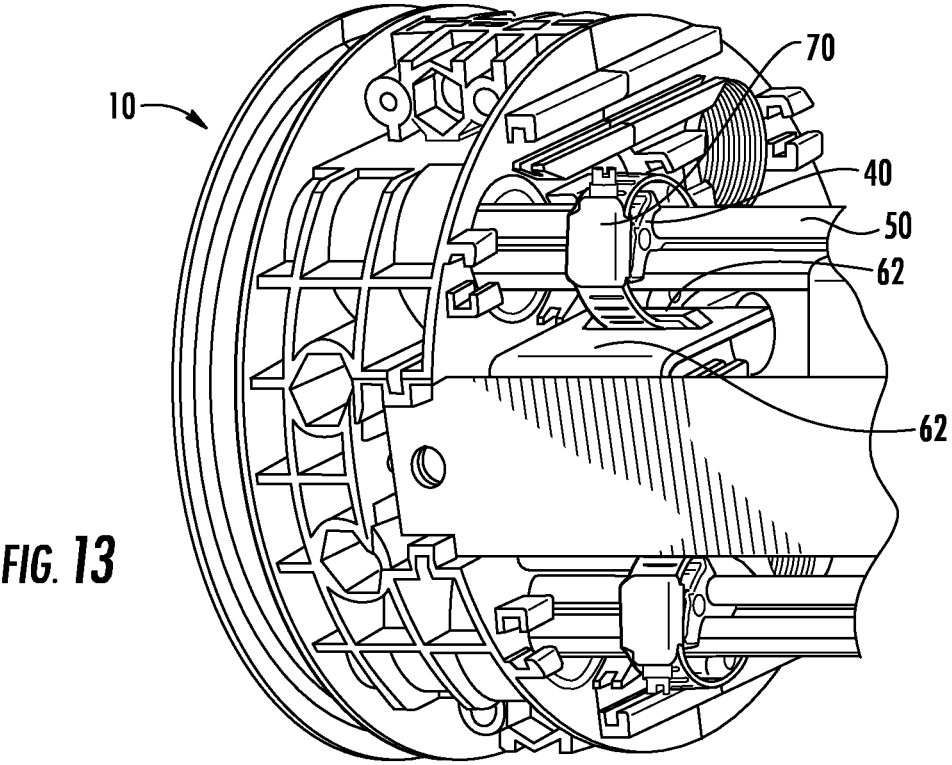
FIG. 13 is a perspective view of the strain relief insert placed about three cables secured to a bulkhead by a clamp.

During assembly, as is shown in FIGS. 12 and 13, cables 50 are inserted laterally into strain relief device 40. Device 40 may be placed alongside, for example, a bulkhead 60 having a securing loop 62. In exemplary embodiments, up to three (3) cables may be secured into strain relief device 40. In the event less than three (3) cables are to be secured, a placer plug may be inserted into an empty cable receiving region 42 to maintain an even compression around the perimeter of strain relief device 40. Once in place, a clamp 70, for example, a hose clamp, may be placed around strain relief device and through loop 62 and made to close by a mechanical operation, e.g., turning a screw or bolt. Once tightened the features of strain relief device cooperate to securely, axially and rotationally, secure each cable relative to one another, to strain relief device 40 to bulkhead 60.

Figure 14:
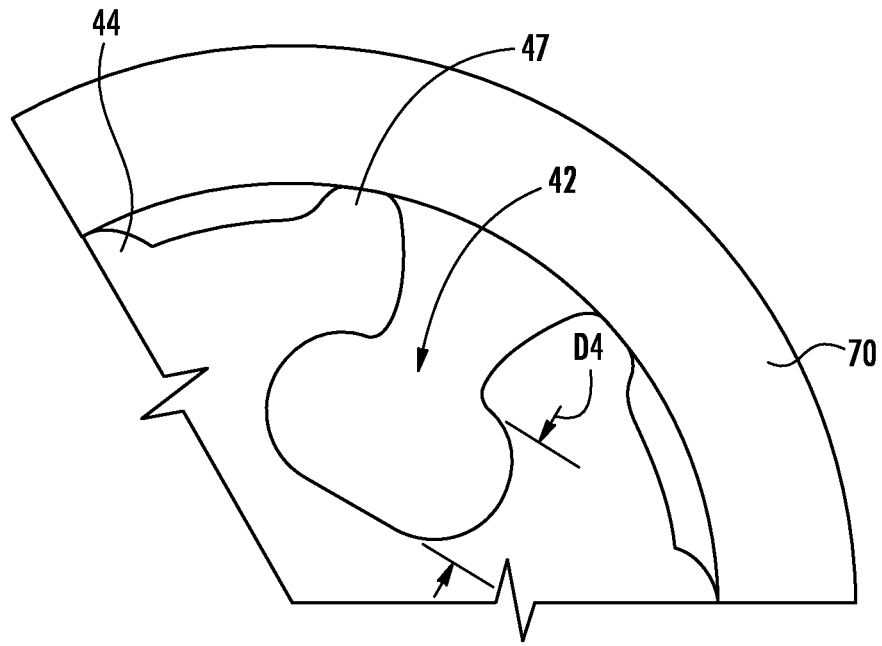
FIG. 14 is a top view of a portion of the strain relief insert with a clamp placed about the strain relief insert before compression by the clamp.
Figure 15:
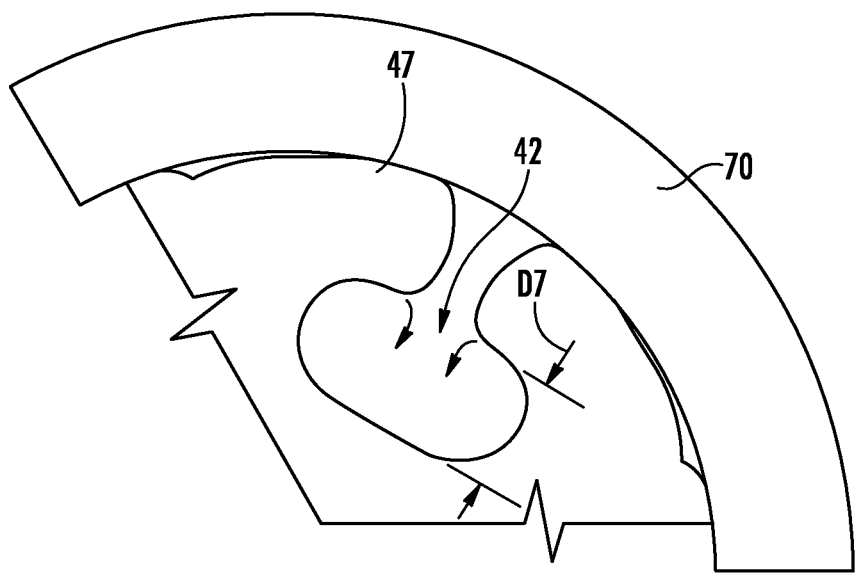
FIG. 15 is a top view of a portion of the strain relief insert with a clamp placed about the strain relief insert after compression by the clamp.

While not under compression clamp 70 may be alongside strain relief device 40, making incidental contact with, for example, stand-off ridges 44 and force concentration lobes 47. Under compression from clamp 70, force concentration lobes 47 may cause cantilevered segments 46 to bend along bending zone 48, with the greatest deflection seen at the outermost portion of cantilevered segment 46, as shown in FIGS. 14 and 15, causing relaxed distance D4 to contract to stressed distance D7, effectively closing on a large portion of the perimeter of, for example, cable 50.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A cable attachment assembly for sealing and retaining at least one cable entering a telecommunications closure through an opening defined in the telecommunications closure, the cable attachment assembly comprising:
   an adapter body, the adapter body associated with the opening of the telecommunications closure, the adapter body providing at least one opening for allowing passage of the at least one cable;
   a grommet device, the grommet device associated with the at least one opening of the adapter body, the grommet device defining at least one passageway for allowing the at least one cable to traverse the grommet device in a generally axial direction relative to the at least one cable;
   a bolt portion, the bolt portion capable of selectively applying a compressive force upon the grommet device such that the grommet device is configured to engage the outer surface of the at least one cable; and
   a grommet washer associated with the grommet device and the bolt portion, wherein the grommet washer:
      has at least one opening to allow the at least one cable to pass through;
      includes a flat region and a raised region; and
      is sandwiched between the bolt portion and the grommet device, the flat region engaging an outer portion of an end of the grommet device on one side and a peripheral surface of the bolt portion on an opposite side, the raised region being oriented away from the grommet device and defining a concave portion for receiving a portion of the grommet device under compression.

2. The assembly of claim 1, the flat region having at least one pre-engagement alignment feature for preventing rotation of the grommet washer relative to the grommet device while the bolt portion applies the compressive force.

3. The assembly of claim 1, the at least one opening associated with both the raised region and the flat region.

4. The assembly of claim 1, the grommet washer including a plurality of openings.

5. The assembly of claim 4, the grommet washer including a support structure associated with each of the plurality of openings.

6. The assembly of claim 5, the plurality of openings on the grommet washer being larger than the passageway of the grommet device for permitting cable shift during installation, the cable shift occurring radially inward.

7. The assembly of claim 4, the support structure including at least one cable engaging surface for contacting the at least one optical cable.

8. The assembly of claim 4, the grommet washer including a support structure associated with each of the plurality of openings, the support structure including at least one cable engaging surface for engaging the at least one cable, the support structure being located substantially on the raised portion.

9. The assembly of claim 8, the support structure defining an offset, the offset capable of supporting the at least one cable in association to at least one other cable such that neither cable contacts the other cable.

10. The assembly of claim 8, the support structure defining an offset capable of supporting the at least one cable in association to at least two other cables such that none of the at least three cables contact any other of the cables.

11. The assembly of claim 1, the grommet washer being made from a polymer selected from the group consisting of a thermoplastic and a thermoset.

12. The assembly of claim 11, the grommet washer being made from a low friction thermoplastic.

13. The assembly of claim 12, the grommet washer being made from a polyoxymethylene.

14. The assembly of claim 1, the grommet device being made from an elastomeric material selected from the group consisting of a rubber, a silicone, a polybutadiene, a fluoroelastomer, a thermoplastic elastomer, a chloroprene, a propylene and a urethane.

* * * * *